United States Patent
Holleis

(10) Patent No.: US 10,419,928 B2
(45) Date of Patent: Sep. 17, 2019

(54) MANAGING DEVICE OWNERSHIP AND COMMISSIONING IN PUBLIC-KEY ENCRYPTED WIRELESS NETWORKS

(71) Applicant: TRIDONIC GMBH & CO KG, Dornbirn (AT)

(72) Inventor: Edgar Holleis, Vienna (AT)

(73) Assignee: Tridonic GmbH & Co KG, Dornbirn (AT)

( * ) Notice: Subject to any disclaimer, the term of this patent is extended or adjusted under 35 U.S.C. 154(b) by 95 days.

(21) Appl. No.: 15/448,868

(22) Filed: Mar. 3, 2017

(65) Prior Publication Data
US 2017/0180985 A1 Jun. 22, 2017

Related U.S. Application Data

(63) Continuation of application No. 14/238,349, filed as application No. PCT/EP2012/065497 on Aug. 8, 2012, now abandoned.

(30) Foreign Application Priority Data

Aug. 12, 2011 (DE) .................. 10 2011 080 876

(51) Int. Cl.
H04W 12/04 (2009.01)
H04W 12/06 (2009.01)
H04L 29/06 (2006.01)

(52) U.S. Cl.
CPC ......... *H04W 12/04* (2013.01); *H04L 63/0442* (2013.01); *H04L 63/18* (2013.01);
(Continued)

(58) Field of Classification Search
CPC ...... H04W 12/04; H04W 12/06; H04L 29/06; H04L 9/00; H04L 9/32–3297;
(Continued)

(56) References Cited

U.S. PATENT DOCUMENTS

| 5,519,878 A | 5/1996 | Dolin, Jr. |
| 2005/0071636 A1 | 3/2005 | Lee et al. |

(Continued)

FOREIGN PATENT DOCUMENTS

CN 1604519 A 4/2005

OTHER PUBLICATIONS

Barnett B et al: "A Secure Framework for Wireless Sensor Networks", Internet Citation, Jun. 2007, XP002466087, Retrieved from the Internet on Jan. 24, 2008: URL: http://www.albany.edu/iasymposium/2007/11-barnettsexton.pdf section III-A.

*Primary Examiner* — Ashokkumar B Patel
*Assistant Examiner* — Quazi Farooqui
(74) *Attorney, Agent, or Firm* — Volpe and Koenig, P.C.

(57) ABSTRACT

A mobile commissioning device for assisting in the commissioning of wireless public-key encrypted networks, the device being provided with:
- means for reading the public key from a network node to be integrated in the wireless network, the channel for reading the public key being physically different to the wireless network channel for which the node is to be commissioned,
- means for at least temporarily storing the read public key in the device,
- means for transferring a public key of the commissioning device to the network node to be commissioned, the channel for transferring the public key preferably being the wireless channel for which the node is to be commissioned, and
- means for transferring the read public key to a trust center.

18 Claims, 1 Drawing Sheet

(52) U.S. Cl.
CPC .............. *H04W 12/06* (2013.01); *H04L 63/06* (2013.01); *H04L 2209/80* (2013.01)

(58) Field of Classification Search
CPC ........... H04L 63/04–0492; H04L 63/08–0892; 04L 63/0442; H04L 63/18; H04L 2209/80; H04L 63/06; G06F 15/16; G06F 21/30–46; G06F 21/60–645; G06F 9/00
USPC ........ 713/150, 153, 168–176, 182–186, 202; 380/28–30, 44–47, 255–287; 726/1–33; 709/206, 225, 229, 249, 389
See application file for complete search history.

(56) References Cited

U.S. PATENT DOCUMENTS

| | | |
|---|---|---|
| 2007/0208930 A1 | 9/2007 | Blank et al. |
| 2008/0037454 A1 | 2/2008 | Werb et al. |
| 2008/0130902 A1* | 6/2008 | Foo Kune ............. H04L 63/062 380/286 |
| 2010/0082988 A1 | 4/2010 | Huebner et al. |
| 2010/0177660 A1* | 7/2010 | Essinger ................. H04W 4/50 370/254 |
| 2010/0327766 A1* | 12/2010 | Recker .................... H02J 7/025 315/291 |
| 2011/0119489 A1 | 5/2011 | Garcia Morchon et al. |
| 2011/0291803 A1* | 12/2011 | Bajic ................. G08B 13/2462 340/10.1 |

* cited by examiner

MANAGING DEVICE OWNERSHIP AND COMMISSIONING IN PUBLIC-KEY ENCRYPTED WIRELESS NETWORKS

CROSS REFERENCE TO RELATED APPLICATIONS

This application is a continuation of U.S. patent application Ser. No. 14/238,349, filed Apr. 22, 2014, which is a 371 National Stage Entry of PCT/EP2012/065497, filed Aug. 8, 2012, the entire contents of which are incorporated by reference as if fully set forth.

FIELD OF THE INVENTION

The invention relates to an encrypted exchange of information in wireless networks. The invention especially relates to asymmetric encryption methods (sometimes called "public-/private-key cryptography"). In these encryption methods, a public key has to be exchanged to allow a sender to encrypt information with a public key of a receiver, where the receiver can then decrypt information encrypted in that way using its private key. The invention hence focuses on the problem of public key exchange in wireless networks and especially in wireless building automation networks.

BACKGROUND

Wireless building automation networks in the sense of the invention are networks used to connect building technology devices forming the network nodes, for example lighting means (such as lamps), sensors (such as light sensors, movement/motion sensors, acoustic sensors, optical sensors, . . . ) and actors (e.g. for controlling window blinds), and/or other controls (equipment such as switches, interrupters, e.g. for controlling lights).

While the invention primarily relates to wireless building automation networks and building technology devices, the principles of this invention can also be used in other fields.

Traditionally, networked building technology devices are connected by and to field busses.

In these traditional setups, no explicit identity management is required and no issues arise concerning the ownership of the connected devices and how they can trust each other. On a field bus, the common assumption is that any device connected to the bus can fully be trusted. It is hence assumed that a device connected to the bus does not lie about its identity and that the ownership of the device is not a problem as, once it is connected to the bus, full ownership over the device is assumed.

In wireless networks, however, there is no wired channel to which the devices can be connected and hence the common model for trusting devices, for assuming ownership and for assuring identity cannot be applied.

Nevertheless in wireless networks the ownership of network nodes still needs to be defined, the identity of the devices connected to the network has to be assured and it needs to be determined which devices can be trusted. Especially, the ownership problem, which the invention implicitly addresses, arises when a wireless network overlaps with another wireless network where both should be separated, i.e. determining whether a specific network node NWN,1 belongs to or is allowed in a specific wireless network.

For example, it is required to prevent devices not belonging to the network from listening in ("eavesdropping") and manipulating network communication.

If such a malicious device would be placed in a company building, an attacker could be able to control building technology devices (lights, doors, . . . ) or may be able to access other secret information.

The invention also targets the commissioning problem, which relates to securely performing an initial setup of the wireless network and the network nodes. One aim of the invention is provide commissioning procedures, which can easily be integrated in the commissioning process.

There are well known technologies available, which can be used to securely communicate in a wireless network. One of these technologies is public/private-key encryption.

Here, the problem of exchanging public keys arises. If the public keys would be exchanged over the wireless network, the communication paths can be intercepted easily and a third party may read a public key and could exchange it with a malicious public key in an effort to perform a man in the middle attack. Therefore, additional security measures are required in wireless networks to perform the exchange of public keys.

Prior art approaches such as e.g. "ZigBee Smart Energy" require installation of a private/public key pair with an additional certificate in the network nodes when the respective node is produced ("manufacture install certificate"). A certificate is a public key signed by an independent, trusted third party, a "certificate authority". In case a customer wishes to add a network node (e.g. a sensor) to the network later, the customer contacts the producer or vendor of the network node and goes through an IT process and cryptographic protocol also involving the certificate authority. In the end the customer's trust center (network management node) securely receives and trusts the new network node and vice versa.

The invention can establish trust between network nodes and trust center without relying on third parties (certificate authority, producer, and vendor).

SUMMARY

The invention provides a solution to the above problems by providing apparatuses and a method as set forth in the independent claims.

In one aspect, the invention provides a mobile commissioning device for assisting in the commissioning of wireless public-key encrypted networks, the device being provided with:
means for reading the public key from a network node to be integrated in the wireless network, the channel for reading the public key being physically different to the wireless network channel for which the node is to be commissioned, means for at least temporarily storing the read public key in the device,
means for transferring a provisional public key of the commissioning device to the network node to be commissioned, the channel for transferring the provisional public key preferably being the wireless channel for which the node is to be commissioned, and
means for transferring the read public key to a trust center.

The public key is "provisional", in so far that it is not permanently stored in the network node. E.g. the storage that holds the provisional public key in the network node first holds the public key of the commissioning device (provisional public key, CD-PUB-KEY) and later the public key of the trust center (TC-PUB-KEY). The keys themselves can be static.

The means for transferring a provisional public key of the commissioning device to the network node to be commissioned and/or the means for transferring the public key to the trust center can be a communication interface for communicating on the wireless network.

The means for reading the public key from the network node to be integrated in the wireless network can be a sensor for actively and/or passively obtaining the public key from the network node.

The means for at least temporarily storing the read public key may be an internal memory and/or external memory to the mobile commissioning device. The storing means can additionally store at least one of a certificate, a signed data record and a nonce (a randomly chosen, secret piece of data to be used in a cryptographic protocol). The mobile commissioning device may be configured to transfer the read public key and the at least one of a certificate, signed data record and nonce to the trust center.

The storing means can be removable and/or exchangeable and/or the mobile commissioning device generates the certificate, signed data record and/or nonce, and/or stores the signed data record or nonce provided by the network node.

The mobile commissioning device can further provide a computing means for generating the certificate, signed data record and/or nonce from the first public key obtained by the reading means.

The reading means may be at least one of a barcode-reader, an RFID-reader, an NFC-interface, a smartcard-reader and an optical and acoustical sensor.

The mobile commissioning device can encrypt the provisional public key with the read public key. The mobile commissioning device can also use a key establishment protocol like ECMQV (a variant of which is also used by ZigBee Smart Energy).

In another aspect, the invention provides a network node for a public-key encrypted wireless network, especially a wireless building automation network, and to be integrated in the wireless network, comprising a means for providing a public key of the network node, the channel over which the public key is provided being physically different to the wireless network channel for which the node is to be commissioned, a storing means for storing at least temporarily a provisional public key transferred to the network node to be commissioned, the channel for transferring the provisional public key preferably being the wireless channel for which the node is to be commissioned, and a storing means for permanently storing a permanent public key transferred to the network node from a trust center.

The permanent public key is permanent in so far that it is stored by the network node and cannot be replaced until a specific command, e.g. a rest command, is submitted to the network node. Such a command can also be submitted by manipulating the network device, e.g. by pressing a reset button or using a reset switch.

Preferably, the network node is a participant of a wireless lighting network, such as e.g.:
  a control device, such as e.g. a user interface,
  a sensor, such as e.g. a smoke, occupancy, light, movement and/or temperature sensor, or
  an operating device for lighting means, such as e.g. gas discharge lamps, LEDs or OLEDs, halogen lamps, . . . .

The provisional public key and/or the permanent public key can be transferred to the network node via a communication means comprised in the network node.

The communication means may be a communication interface for communicating on the wireless network. The means for providing a public key of the network node, can be configured to provide the public key in a way it can be actively or passively read by a reading means of a mobile commissioning device. In particular, the means for providing a public key of the network node can be at least one of a barcode, RFID-tag, NFC-interface and an optical and/or acoustical signaling unit.

The network node can further comprise a computing means to check the validity of the certificate, singed data record and/or nonce transferred to the network node. The network node can further provide a computing means generating the nonce or for generating the signed data record based on its public key.

The network node may store the certificate, singed data record and/or nonce in the storing means.

The network node may store the permanent public key in the storing means after it verified the certificate, singed data record and/or nonce.

The permanent public key can invalidate and/or replace the preliminary public key.

The providing means can, in addition to the public key, provide an identifier, e.g. a MAC address.

The providing means may be at least one of a barcode, RFID tag, NFC interface, smart card and an optical, e.g. a LED, and/or acoustical signaling unit.

In a further aspect, the invention provides a trust center in a network, especially a wireless building automation network, comprising a communication means for communicating on a wireless network, wherein the trust center is configured to receive at least one public key of at least one network node (at least one NWN-PUB-KEY) to be integrated in the wireless network from a mobile commissioning device, and wherein the trust center is further configured to transfer a permanent public key to the at least one network node.

The trust center can be configured to additionally receive from the mobile commissioning device at least one certificate, singed data record and/or nonce and to transfer the at least one certificate, singed data record and/or nonce to the at least one network node with the permanent public key.

The trust center may further comprise a storage means reader for reading a storage means of a mobile commissioning device.

The storage means reader can be a reader for an exchangeable and/or removable storage means.

The trust center may transmit its permanent public to all network nodes.

The trust center can use the public key of the at least one network node (NWN,1) to encrypt and/or securely transfer the trust center key to the at least one network node (NWN,1).

In yet another aspect, the invention provides a method for commissioning wireless public-key encrypted networks, especially wireless building automation networks such as e.g. lighting networks, comprising the steps of obtaining a public key of a network node, the channel over which the public key is obtained being physically different to the wireless network channel for which the node is to be commissioned, storing the obtained public key to a storing means of a mobile commissioning device, transferring a preliminary public key from the mobile commissioning device to the network node, transferring the public key of the network node from the mobile commissioning device to a trust center, and transferring a permanent public key to the network mode.

A certificate, singed data record and/or nonce can be additionally transferred from the mobile commissioning device to a trust center. The certificate, signed data record and/or nonce may be transferred with the permanent public key to the network node.

The certificate singed data record and/or nonce can be generated by the mobile commissioning device or the network node.

Before the preliminary public key is transferred to the network node, the network node may be powered and/or the network node can scan for available networks.

The mobile commissioning device can act as temporary trust center.

After the transfer of the preliminary public key to the network node, the network node may provide a specified level of functionality.

A storing means removable from the mobile commissioning device may be used to transfer the public key of the network node and/or the certificate, singed data record and/or nonce to the trust center.

After the transfer of the permanent public key to the network node it can be determined whether a correct number and/or type of network nodes is present in the network and/or devices are detected with wrong security parameters to exclude from the network.

The certificate, singed data record and/or nonce (OTR) may be generated by the mobile commissioning device.

The certificate, signed data record and/or nonce (OTR) can be generated by the network node and transferred to the mobile commissioning device.

In still a further aspect, the invention provides a system of at least one network node as described above, at least one mobile commissioning device as described above and a trust center as described above. In the system, a commissioning method as described above may be used.

BRIEF DESCRIPTION OF THE DRAWINGS

Additional aspects of the invention are now described in detail in view of the figures, wherein FIG. 1 schematically shows components of the inventive system, and FIG. 2 schematically shows the information exchange between the components of FIG. 1.

DETAILED DESCRIPTION OF THE PREFERRED EMBODIMENTS

Figure 1:
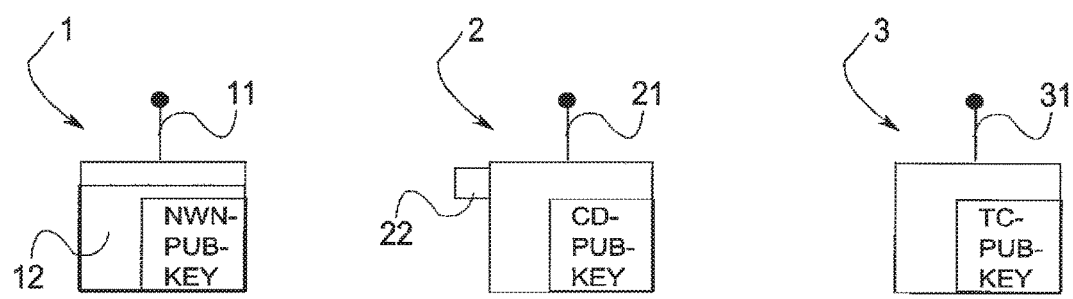

The invention assumes that each network node, which should participate in the automation network, is able to provide its respective public key without using the communication paths of the wireless network used for the wireless communication, which means 'out-of-band', i.e. on a communication path physically separate from the wireless communication paths later network.

Preferably, the network node is a participant of a wireless lighting network, such as e.g.:
  a control device, such as e.g. a user interface,
  a sensor, such as e.g. a smoke, occupancy, light, movement and/or temperature sensor, or
  an operating device for lighting means such as e.g. gas discharge lamps, LEDs or OLEDs, halogen lamps, . . . .

The invention assumes that each network node, which should participate in the automation network, is able to provide its respective public key without using the communication paths of the wireless network used for the wireless communication, which means 'out-of-band', i.e. on a communication path physically separate from the wireless communication paths later used for information transmission on the wireless network.

Preferably, the network node is a participant of a wireless lighting network, such as e.g.:
  a control device, such as e.g. a user interface,
  a sensor, such as e.g. a smoke, occupancy, light, movement and/or temperature sensor, or
  an operating device for lighting means, such as e.g. gas discharge lamps, LEDs or OLEDs, halogen lamps, . . . .

This 'out-of-band' exchange needs to be performed in a way that can be easily handled by staff typically installing the network nodes in a building and has to provide secure communications as the public keys of the network nodes (NWN-PUB-KEYs) need to be installed at least in a trust center and the public key of the trust center (TC-PUB-KEY) has to be installed in the network nodes.

To achieve this, each network node NWN,1 can e.g. provide its public key (NWN-PUB-KEY) by display of a barcode (such as a QR-Code), by an RFID tag, NFC communication interface or through a Smartcard affiliated with the network node.

The provision of the public key (NWN-PUB-KEYs) for each network node NWN,1 allows obtaining the public key out-of-band as e.g. the barcode can be read by a barcode reader an can hence be transferred outside the wireless communication paths.

As explained above, the network nodes are typically installed in an incremental fashion and hence the trust center, which e.g. can be a central control unit of the automation network, might still not be in place or not working when the network nodes are installed. Also, the network nodes need to provide at least a basic functionality even if the trust center is not available, e.g. the lights need to work.

The invention solves this problem by providing a device which can be used by installation staff when the network nodes are installed. This tool, called "mobile commissioning device" in the following is able to obtain the public keys (NWN-PUB-KEYs) from the network nodes.

Figure 2:
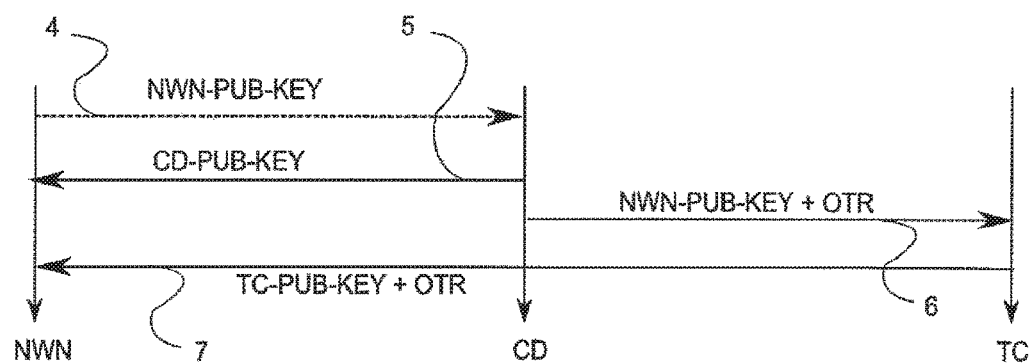

To achieve this, the mobile commissioning device CD,2 uses a sensor, e.g. a barcode reader, RFID tag reader, NFC communication interface, a reader for a smartcard, etc. to read the public key (NWN-PUB-KEY) from the network nodes (FIG. 2, 4). As the network nodes can also use other means to "publish" their public keys, e.g. optically (e.g. by using an LED (blinking)) and/or acoustically, the mobile commissioning device CD,2 just needs a respective fitting sensor able to recognize and/or decode the way the public key (NWN-PUB-KEY) is published.

In one aspect of the invention, the mobile commissioning device CD,2 uses barcodes displayed on the network nodes (switches, sensors, operating devices, e.g. a 2D-barcode, which at least display information from which the public key (NWN-PUB-KEY), and, optionally, an identifier, such as a unique address of the network node NWN,1 (e.g. a MAC-address) can be derived.

The mobile commissioning device CD,2 is also able to install (FIG. 2, 5) a preliminary public key (CD-PUB-KEY) in the network nodes NWN,1. Additionally, the mobile commissioning device CD,2 is also capable of transferring the public keys (NWN-PUB-KEYs) of the network nodes to the trust center at a later stage.

Commissioning using the mobile commissioning device CD,2 hence requires the execution of the following steps:

In a first step, the mobile commissioning device CD,2 obtains a public key (NWN-PUB-KEY) from a network node, e.g. by reading a barcode of a network node. The mobile commissioning device CD,2 then saves the obtained public key (NWN-PUB-KEY) to an internal or external memory, such as, for example a memory card (e.g. SD-card).

Afterwards, the network node NWN,1 is, e.g., switched on if not already active.

The mobile commissioning device CD,2 now acts as a temporary trust center and the network node NWN,1 can communicate with the mobile commissioning device CD,2 over a wireless channel.

Now, the mobile commissioning device CD,2 installs a (preliminary) public key (CD-PUB-KEY) in the network node NWN,1. The mobile commissioning device CD,2 can use the public key of the network node (NWN-PUB-KEY) NWN,1 to engage in a cryptographic key exchange like ECMQV, or simply encrypt its transmitted public key (CD-PUB-KEY) with the public key of the network node (NWN-PUB-KEY). The private and public key of the mobile commissioning device CD,2 can be fixed or changeable, e.g. recomputed by request of the user of the mobile commissioning device.

The mobile commissioning device CD,2 also stores additional information from the network node NWN,1, in particular an "ownership transfer record" (OTR) and/or the identifier obtained from the network node NWN,1.

The OTR is a certificate and/or data record, which allows a participant of the network using the OTR to transfer a new public key to the network node NWN,1 once, as the public key that should be used for authenticating the trust center. The OTR can either be generated and/or stored by the network node NWN,1 and then transferred to the mobile commissioning device CD,2 using either the wireless network or the 'out-of-band' communication means, or the OTR can be generated by the mobile commissioning device CD,2 for the network node, or the OTR can be the result of a cryptographic protocol between network node NWN,1 and the mobile commissioning device CD,2.

This means, the public key, which the network node NWN,1 holds for authenticating its trust center, and which is the preliminary public key (CD-PUB-KEY) received from the mobile commissioning device CD,2 can be changed once when the OTR is submitted to the network node NWN,1 together with a new public key.

Therefore, the public key of the mobile commissioning device CD,2 acting as a preliminary trust center can be exchanged by the public key of the "final" trust center in the finally established wireless network.

The security of the OTR can either be based on digital signatures, or on a cryptographic nonce agreed to by the network node and the mobile commissioning device.

After the transfer (FIG. 2, 5) of the preliminary public key (CD-PUB-KEY) to the network node NWN,1, the network node NWN,1 in one aspect of the invention is already capable of some basic communication functionality so that, for example, when one switch is activated all lighting means on the network can be activated through wireless communication.

In a further step, the information stored in the memory of the mobile commissioning device CD,2 is transferred to the final trust center TC,3. This means that for each network node NWN,1 a public key (NWN-PUB-KEY) as well as maybe the respective OTR is transmitted to the final trust center TC,3. Using the OTR the trust center is able to install its public key (TC-PUB-KEY) in the network nodes NWN,1.

After this step, the exchange between the public keys of the network nodes NWN,1 and the trust center is completed and the public keys have been securely exchanged.

The trust center can now perform additional steps required in the commissioning procedure, such as auditing, whether the correct number of network nodes NWN,1 and the correct types of network nodes NWN,1 are connected to the wireless network and to detect devices with wrong security parameters.

Instead of the barcode, RFID tag or NFC communication interface, also other means can be provided at the network nodes NWN,1 that allow the network node NWN,1 to display information. That can for example be a blinking LED, an acoustic coupling or an otherwise readable code, including but not limited to a human readable label.

After the installation of the permanent public key (TC-PUB-KEY), and optionally the auditing step, trust is established in the wireless network and the network nodes NWN,1 are now fully trusted or to a predefined degree.

In summary, the invention uses known cryptographic techniques (encryption, signatures, certificate) in a wireless network, such as a wireless building automation network, in order to manage identity, ownership and trust. More precisely, it implements an initial, trusted, outofband key exchange in a way compatible with established procedures, especially of the lighting and construction industries and requires only minimal manual intervention. Therefore it does not increase the burden on the staff installing the network nodes.

The invention is now exemplarily explained in even more detail.

At the construction site, equipment belonging to the wireless network is installed and commissioned at different points in time. For example, lighting gear (lighting fixtures, interrupters, controls, circuit breakers) is installed by electricians. HVAC (Heating, Ventilating and Air Conditioning) gear (valves, controls, AC units, . . . ) is typically installed by plumbers, electricians and specialized craftsmen. This installation normally progresses incrementally, floor by floor, at a time when other parts of the building may not even be erected while other parts may already be close to completion. It is important for fast and efficient progress of the construction that the installed equipment, especially lighting, can already fulfill its basic operation at a time before the building automation network has been properly commissioned and fully parameterized.

In DALI (Digital Addressable Lighting Interface) for example, all interrupters switch all lights within the DALI loop as poweron is a default setting. At a later stage, the commissioner binds controls to lights as well as program groups and scenes. Most of the time a computer is used in the commissioning step where the commissioning is based on plans provided by the architect. Before completion of the building, the precompiled parameters are programmed into the building automation system. At that stage there often is neither time, nor manpower for visiting all nodes of the network in order to install security identifiers. Many network nodes NWN,1 will not even be accessible anymore at that stage, as they are embedded in ceilings or walls.

The invention therefore considers the following constrains:

Any steps requiring physical access to network nodes NWN,1 need to be performed during installation even though neither a network management nor any other central network infrastructure can be assumed to be operational at that time.

The installation procedures should not be complicated and only the simplest possible manipulations are eligible since, e.g., the staff installing the equipment is limited in it capabilities. It also has to be possible to perform all necessary steps overhead and e.g. with thick working gloves, and without mains power.

After initial powering of newly installed network nodes NWN,1 or even a network segment, the devices/segment needs to be able to provide at least some limited functionality, for example, all lights should work (e.g. all interrupters switch all lights), the network nodes NWN,1 should be able to indicate to the electrician that they were correctly installed, a full operation of security protocols is not required, but vandalism as well as manipulations that may subvert security at a later stage has to be prevented.

An example for the security protocol according to the invention is now described. While the protocol is described for number of network nodes NWN,1, the protocol, of course, can also be performed by with a single network node NWN,1:

1. The network nodes NWN,1 have a MAC level address and a public key (NWN-PUB-KEY) (created at manufacturing time) printed on the casing in computer readable form, e.g. a QRCode (or a 2D bar code).

2. An electrician uses a mobile commissioning device CD,2 providing a QR code reader, a wireless network interface and a removable storage media (SD card). The mobile commissioning device CD,2 may additionally provide additional interface elements including, e.g., at least one of a "SCAN" button to activate the QR code reader, an "On/Off" switch, and an LED and/or a beeper to, e.g., visually and acoustically indicate successful scanning. Furthermore the mobile commissioning device CD,2 requires a wireless communication interface to communicate with at least with the network nodes NWN,1.

3. Whenever the staff installs a network node NWN,1, first the Barcode is scanned. The mobile commissioning device CD,2 indicates successful scanning and saves MAC address and public key (NWN-PUB-KEY) to the storage media. No communication needs to be performed over the wireless network at scan time, since it is assumed that mains powered devices will not be powered.

4. At first power on of the network nodes NWN,1, they will send a beacon request (IEEE 802.15.4) which is answered by all available networks. The nodes will attempt to join the networks willing to accept new devices. This involves contacting the coordinator and trust center of the respective network (this is a standard procedure as specified e.g. in the ZigBee Home Automation profile). In a specific case, the mobile commissioning device CD,2 acts as temporary network coordinator and trust center and it will allow joining of the newly powered devices if they were previously scanned and the mobile commissioning device CD,2 therefore finds their MAC addresses on the storage medium.

5. After the network nodes NWN,1 joined, the mobile commissioning device CD,2 will take over the ownership over the network node NWN,1. This involves the following steps:

The new network nodes NWN,1 authenticate themselves to the mobile commissioning device CD,2. The network node NWN,1 proves that they know the private keys belonging to the public keys (NWN-PUB-KEYs) acquired during scanning of the network nodes;

The mobile commissioning device CD,2 inscribes itself as owner into the new network nodes NWN,1 by conveying its own public key (CD-PUB-KEY) to them, a procedure the new network nodes NWN,1 will only allow once (unless it is reset to factory defaults);

The mobile commissioning device CD,2 creates a new OTR for each network node NWN,1, signed by its own private key and saves the OTR on the storage media, which can be used at a later stage to transfer ownership of the network nodes NWN,1 from the mobile commissioning device CD,2 to the permanent network coordinator (permanent trust center) TC,3 during final commissioning; Alternatively the OTR is created and signed by the network node NWN,1 and communicated to the mobile commissioning device CD,2. Alternatively the security of the OTR is based not on signatures but on a nonce negotiated between network node NWN,1 and mobile commissioning device CD,2.

The mobile commissioning device CD,2 transfers the its public key (CD-PUB-KEY) to the new network nodes that allows it to function in half commissioned mode (the lifecycle is advanced from non-commissioned to half-commissioned).

6. The new network nodes NWN,1 then enter half-commissioned mode and function in accordance with the requirements. They can also communicate with nodes commissioned by a different mobile commissioning device CD,2, as long as both tools hand out equal network names and network keys (CD-PUB-KEY), or provide other means of establishing trust between different nodes bound to different commissioning devices.

7. At any point during or after installation of the network nodes NWN,1, the information stored on the storage media of the mobile commissioning device CD,2 is transferred to the final trust center TC,3. Then, the first step of commissioning is performed, which is the transfer of the ownership of the devices to the new permanent network coordinator (final trust center TC,3):

The new permanent network coordinator (final trust center TC,3) first joins the half commissioned network;

The permanent network coordinator (final trust center TC,3) then uses the OTRs to transfer its own network key (TC-PUB-KEY), the final public key of the final trust center TC,3 and the network nodes NWN,1 accept the transfer of ownership;

Finally, the permanent network coordinator (final trust center TC,3) deactivates the network key of the mobile commissioning device CD,2 (CD-PUB-KEY) used for the half commissioned mode (the lifecycle is advanced from half-commissioned to commissioned);

This last step implicitly authenticates the new permanent network coordinator to all network nodes NWN,1, because nodes controlled by rouge mobile commissioning devices CD,2 will now forcibly drop off the network since they are now unable to participate in key negotiation with the trust center.

After step 7, high grade security is established and the commissioner can continue with commissioning the network. The protocol can be implemented on any IEEE 802.15.4 or similar SoC with adequate resources, or with the help of a crypto coprocessor and secure key storage (a smartcard).

As mentioned above, the scanning of a barcode can be replaced by comparable technologies such as RFID. RFID allows the mobile commissioning device CD,2 to assume ownership of the nodes at scan time by imprinting its own public key early. The mobile commissioning device CD,2 does not need to communicate with each device individually at poweron-time. The mobile commissioning device CD,2 may also communicate with the device via NFC which can additionally power a device's micro controller. Device and mobile commissioning device CD,2 can go through the full protocol at scan time, eliminating the power-on phase completely.

With infrastructure for ownership management in place, the mobile commissioning device CD,2 can be used to map device identities (addresses) to physical location. For this purpose the mobile commissioning device CD,2 needs to be aware of the location which can be achieved in one of the following ways:

The mobile commissioning device CD,2 features a human interface which allows the electrician to keep track of the room number, and/or the building/installation plan e.g. features additional information, e.g. barcodes, RFID-tags, etc., that encode the location. The staff alternately scans the location from the plan and the device identity from the device to be installed, and/or the mobile commissioning device CD,2 supports in-door localization or any other localization technique such as GPS.

The location aware mobile commissioning device CD,2 saves the location information together with the OTRs to the removable storage. If mobile commissioning device CD,2 and device communicate via RFID or NFC, the mobile commissioning device CD,2 may convey the location information to the device at scan time.

FIG. 1 exemplarily and schematically shows the components of the inventive system: A network node 1 with a communication interface 11 providing a public key (NWN-PUB-KEY); a mobile commissioning device 2 with a communication interface 21 and a sensor 22 (e.g. a barcode-, smartcard-, RFID or NFC-reader) providing at least a public key (CD-PUB-KEY), but can also provide a (generated) OTR; a trust center 3 with a communication interface 31, providing a public key (TC-PUB-KEY).

FIG. 2 shows schematically how the public keys (and also the OTRs) are exchanged in the system in respect to FIG. 1. The dotted arrow 4 shows that a separate communication path is used to obtain 4 the public key (NWN-PUB-KEY) from the network node NWN,1 by the mobile commissioning device CD,2. This communication path differs from the communication path used for the remaining key transmissions 5, 6 and 7.

What is claimed is:

1. A mobile commissioning device (CD) for commissioning of a wireless lighting network, the CD comprising:
a sensor configured for acquiring an unencrypted public key (NWN-PUB-KEY), using a first wireless communications channel, from a lighting network node (NWN) to be integrated in the wireless lighting network;
a memory configured for storing the NWN-PUB-KEY, wherein the memory is at least one of an internal memory or external memory of the CD, wherein the memory is also configured for storing an ownership transfer record (OTR) acquired from the NWN, and wherein the OTR is at least one of a certificate, a signed data record, or a nonce;
a communications interface configured for transferring cryptographically a provisional first public key (CD-PUB-KEY) of the CD to the NWN using a second wireless communications channel and the stored NWN-PUB-KEY, wherein the first wireless communications channel does not operate on the wireless lighting network, and wherein the second wireless communications channel operates on the wireless lighting network; and
the communications interface also configured for instructing the NWN on the second wireless communications channel to activate a lighting means, an operating device for the lighting means, or a sensor of the NWN, then transferring the NWN-PUB-KEY and the OTR to a trust center (TC) after instructing the NWN to activate the lighting means, an operating device for the lighting means, or a sensor of the NWN.

2. The CD of claim 1, wherein the sensor is active or passive, and selected from the group comprising of: a barcode-reader, a QR code an RFID-reader, NFC-interface, a smartcard-reader, or an optical and acoustical sensor.

3. The CD of claim 1, further comprising a GPS configured for determining the location of the CD at the time of receiving the OTR, and the memory further configured for storing the location with the OTR.

4. The CD of claim 1 wherein the communications interface is further configured for receiving the OTR using the first wireless communications channel.

5. The CD of claim 1, further comprising a GPS configured for determining a location of the CD at the time of communicating with the NWN via the first wireless communication channel, and transferring the location to the NWN via the first wireless communication channel.

6. A lighting network node (NWN) for use in a wireless lighting network, the NWN comprising:
a communication element for providing an unencrypted public key (NWN-PUB-KEY) of the NWN on a first wireless communications channel, wherein the first wireless communications channel does not operate on the wireless lighting network;
a communication interface configured for receiving a provisional first public key (CD-PUB-KEY) from a commissioning device (CD) using the NWN-PUB-KEY for a cryptographic key exchange over a second wireless communications channel, wherein the CD-PUB-KEY is encrypted with the NWN-PUB-KEY before the exchange, and the second wireless communications channel operates on the wireless lighting network;
a memory configured for storing the CD-PUB-KEY transferred the NWN from the CD over the second wireless communications channel used for communication on the wireless lighting network for which the NWN is to be commissioned; and
the communications interface also configured for receiving instructions to activate a lighting means, an operating device for the lighting means, or a sensor of the NWN, then receiving a permanent public key (TC-PUB-KEY) from a trust center (TC), where the memory is further configured for storing the TC-PUB-KEY after the NWN verifies an ownership transfer record (OTR), wherein the OTR is a certificate, signed data record, or a nonce.

7. The NWN of claim 6, wherein the communication element for providing the NWN-PUB-KEY is further configured to provide the NWN -PUB-KEY in an actively or passively readable form for a sensor of the CD.

8. The NWN of claim 7, wherein the communication element providing is at least one of a barcode, QR code, RFID-tag, NFC interface, smartcard, a LED interface, or an acoustic interface.

9. The NWN of claim 6, wherein the TC-PUB-KEY invalidates and/or replaces the CD-PUB-KEY.

10. The NWN of claim 6, wherein the providing means provides, in addition to the NWN-PUB-KEY, an identifier of the NWN.

11. The NWN of claim 6, wherein the communication interface receives a location with the OTR.

12. The NWN of claim 6, wherein the OTR is generated by the NWN and the communications interface sends the OTR to the CD using the first wireless communications channel.

13. A method for commissioning nodes for a wireless lighting network performed by a commissioning device (CD), the method comprising:
acquiring an unencrypted public key (NWN-PUB-KEY) of a network node (NWN) over a first wireless channel, wherein the NWN is at least one of a lighting means, an operating device for the lighting means, an operating device for the lighting means, or a sensor;
storing the NWN-PUB-KEY to a memory of the CD;
transferring a provisional first public key (CD-PUB-KEY) to the NWN using a second wireless channel, wherein the second wireless channel operates on the wireless lighting network, and the first wireless channel does not operate on the wireless lighting network, wherein the CD encrypts the CD-PUB-KEY using the NWN-PUB-KEY before the transfer; wherein the first wireless channel and the second wireless channel use different communication technologies; and
instructing the NWN on the second wireless channel to activate the lighting means, an operating device for the lighting means, or a sensor;
transferring, after instructing the NWN, the NWN-PUB-KEY and an ownership transfer record (OTR) from the CD to a trust center (TC), wherein the OTR is one of a certificate, signed data record or a nonce.

14. The method of claim 13, wherein the OTR is jointly negotiated by the NWN and the CD.

15. The method of claim 13, further comprising determining the location of the CD by a GPS at the time of receiving the OTR, and the memory further configured for storing the location with the OTR.

16. The method of claim 13, further comprising receiving the OTR using the first wireless communications channel.

17. The method of claim 13, further comprising determining a location of the CD at the time of communicating with the NWN via the first wireless channel, and transferring the location to the NWN using the first wireless channel.

18. A trust center network management unit (TC) in a wireless lighting network, the TC comprising:
a communication interface, for communicating on the wireless lighting network configured to receive at least one public key (NWN-PUB-KEY) from a commissioning device (CD) of at least one network node (NWN) over a wireless channel of the wireless lighting network; and
the communication interface further configured to transfer a permanent second public key (TC-PUB-KEY) to the at least one NWN on the wireless lighting network after a lighting means, an operating device for the lighting means, or a sensor of the NWN has been activated by the CD, wherein the TC-PUB-KEY is securely transferred with an ownership transfer record (OTR), and the OTR is one of a certificate, signed data record, and/or a nonce.

* * * * *